United States Patent [19]

Rasmussen

[11] Patent Number: 4,887,777
[45] Date of Patent: Dec. 19, 1989

[54] ICE FISHING REEL WINDING DEVICE

[76] Inventor: Trent T. Rasmussen, 418 Wood Ave., Nekoosa, Wis. 54457

[21] Appl. No.: 307,698

[22] Filed: Feb. 7, 1989

[51] Int. Cl.$^4$ ............................................. A01K 89/00
[52] U.S. Cl. .................................... 242/106; 242/250; 43/17
[58] Field of Search .................... 242/250, 96, 106; 43/17, 17.5, 26.1

[56] References Cited

U.S. PATENT DOCUMENTS

| | | | |
|---|---|---|---|
| 2,876,579 | 3/1959 | Plouffe | 43/17 |
| 2,970,400 | 2/1961 | Nolir | 43/17 |
| 3,126,166 | 3/1964 | Weinberg | 242/250 |
| 3,440,753 | 4/1969 | Kelley | 43/17 |
| 3,568,352 | 3/1971 | Hill | 43/26.1 |
| 3,784,125 | 1/1974 | Law et al. | 242/96 |
| 4,285,154 | 8/1981 | Grahl | 43/17 |
| 4,588,139 | 5/1986 | Lines | 242/54 R |

FOREIGN PATENT DOCUMENTS 1009370 4/1983 U.S.S.R. ................. 43/26.1

Primary Examiner—Katherine A. Matecki
Attorney, Agent, or Firm—Lathrop & Clark

[57] ABSTRACT

An apparatus is disclosed for automatically winding fish line onto the reel assembly of an ice fishing tip-up device. The apparatus includes a hand grip connected to one end of a reel shaft, a motor with a rotatable drive shaft connected to the other end of the reel shaft, a projecting trip shaft pin positioned on the drive shaft, a power source connected to the motor, and a push button or similar device to actuate the power operation of the motor.

11 Claims, 3 Drawing Sheets

ICE FISHING REEL WINDING DEVICE

BACKGROUND OF THE INVENTION

1. Field of the Invention

The present invention generally relates to the field of ice fishing. Specifically, the present invention relates to an apparatus for automatically winding the reel of an ice fishing device.

2. Description of the Prior Art

Ice fishing tip-up devices are well known to the prior art. Such devices are beneficial in that they have a mechanism for automatically catching the fish and signaling the fisherman while the fisherman is in a warmer location. This is generally done by a flag or an electric light activated by a fish attacking the line. Such devices are well known to the art. Suitable devices are marketed under the names "BEAVER DAM" and "POLAR".

When fishing is complete, the line must be rewound onto the reel. Generally this is done by a set handle attached to the fishing line reel. While this may seem a rather simple task to wind the line back onto the reel, the simplicity of the task can be made more burdensome by the severely cold weather which is part of the ice fishing season. In the interest of saving time and to get out of the cold weather, the ice fisherman will generally wrap the line around the ice fishing device rather than take the time to wind the fishing line back on the reel. The fisherman will then take the device to a warmer location in order to complete the job properly. Rather than have to hurriedly wrap the line around the ice fishing device only to have to unwrap it and rewind the line onto the ice fishing reel, it would be preferable to develop an apparatus which quickly, conveniently and automatically wind the fishing line onto the reel of the ice fishing device.

Automatic fishing reel wind-up devices are known to the art. For example, U.S. Pat. No. 3,126,166 to Weinberg discloses an electric motor drive for a fishing reel in which a set of pins is designed to fit within defined spaces in the handcrank of a reel. The type of reel contemplated is a deep sea fishing reel. U.S. Pat. No. 3,784,125 to Law, et al. discloses a battery operated apparatus for fishing in which the reel is rotated by means of a system of gears. U.S. Pat. No. 4,588,139 to Lines is directed to a fishing reel wind-up device designed for adding a supply of line to a reel. While all of these patents disclose some form of automatic wind-up device, no device is yet known for effecting a simple, fast and efficient reel winder specifically designed for an ice fishing device.

SUMMARY OF THE INVENTION

It is an object of the present invention to provide an automatic ice fishing reel wind-up device, which is simple, efficient and useful under ice fishing conditions.

It is further an object of the present invention to provide an automatic ice fishing reel wind-up device which is convenient, portable and useful for most ice fishing devices known to the art.

These objects and others are addressed by the present invention which is directed to an ice fishing reel wind-up device for automatically winding fish line on a reel of an ice fishing device. The ice fishing device includes a support frame and an elongated tube connected to the support frame. The elongated tube has a first end and a second end. The first end comprises a reel which includes fishing line and the second end comprises a rotatable trip shaft. The apparatus of the present invention, known as a reel winder, comprises a reel shaft of defined length. The reel shaft has a first end and a second end. The first end comprises a hand grip for holding the reel winder. The second end comprises a motor which includes a rotating drive shaft. Positioned on the rotating drive shaft is a projecting trip shaft pin, which will engage the trip shaft of a standard ice fishing device. The reel winder also includes a power source connected to the motor, and means for selectively connecting power from the power source to the motor. It is also within the scope of the present invention to provide a light source on the ice fishing reel winder, such that the reel winder can double as a hand-held flashlight.

The reel winder of the present invention eases the nasty job of gathering the fishing line from ice fishing tip-up devices at the end of the day. The reel winder is fast and efficient. It will also wind the line at a proper tension in order to discourage the formation of knots on the line.

Further objects, features and advantages of the invention will be apparent from the following detailed description when taken in conjunction with the accompanying drawings.

DETAILED DESCRIPTION OF THE INVENTION

Figure 1:
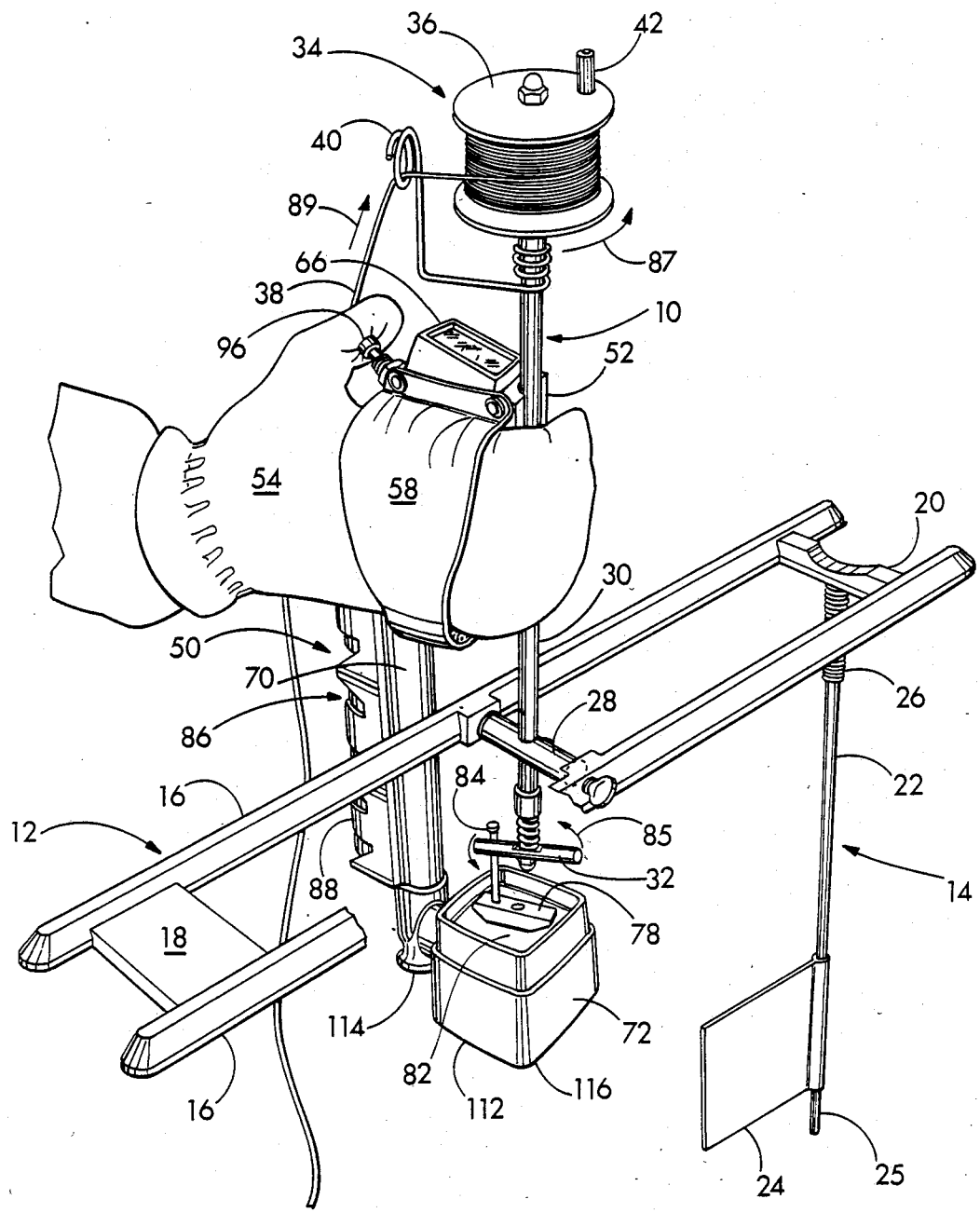
FIG. 1 is a front perspective view of the reel winder of the present invention in conjunction with a standard ice fishing tip-up device.

Referring now to FIG. 1, there is illustrated an ice fishing tip-up device 10 known to the art. Such a device is disclosed in U.S. Pat. No. 4,285,154 to Grahl, which is incorporated herein by reference for a description of an ice fishing tip-up device. Similar devices are sold under the names "BEAVER DAM" and "POLAR". The tip-up device 10 includes a supporting frame 12 and a flag assembly 14. For purposes of illustration with the apparatus of the present invention, the tip-up device 10 is shown in FIG. 1 in inverted condition. The frame 12 includes a pair of substantially parallel transversely spaced rails 16 which are connected at either end by end members 18 and 20 respectively.

The flag assembly 14 includes an elongated flag mast 22 having a flag 24 extending at one end. A tip portion 25 of the mast 22 extends beyond the flag 24. The other end of the flag mast 22 is inserted into a coiled spring 26, which is attached to the end member 20. Located between the end members 18 and 20 is a rotatable center mounting shaft 28 to which is attached an elongated tube 30. At one end of the elongated tube is a rotatable trip shaft 32, which is intended to hook the tip portion 25 of the flag assembly 14 in a bent position. When the trip shaft 32 is rotated, it causes the flag assembly 14 to spring to an upright position.

At the other end of the elongated tube 30 is a reel assembly 34 comprising a fishing line reel 36 upon which is wound fishing line 38. A line holder guide 40 is generally provided in order to facilitate the winding of the fishing line 38 onto the reel 36. Additionally, a set handle 42 may be provided on the reel 36 in order to manually operate the reel. The reel 36 is rotatably connected to the trip shaft 32 by means of an axle located within the elongated tube 30.

In operation, the tip-up device 10 is placed on an ice fishing hole such that the reel assembly 34 is located within the hole and in the lake. The flag assembly 14 is bent by means of the spring 26 such that the tip 25 of the flag assembly 14 is placed in position under the trip shaft 32. When the fishing line 38 is pulled, such as by a fish taking the bait or striking the hook, the reel 36 will be rotated thus causing the rip shaft 32 to be rotated to release the flag assembly 14, thus signalling a fish strike.

Turning now to the present invention, as illustrated in the remaining figures as well as FIG. 1, there is illustrated a reel winder, generally indicated at 50, which has the purpose of facilitating the winding up of the fishing line 38 onto the reel 36 when the ice fishing device 10 has been removed from the ice hole. Although not necessary, the hand grip area 52 is preferably provided with a groove 56 for placement of the elongated tube 30 of the ice fishing device 10 in proper alignment for use with the reel winder 50.

Figures 2, 3:
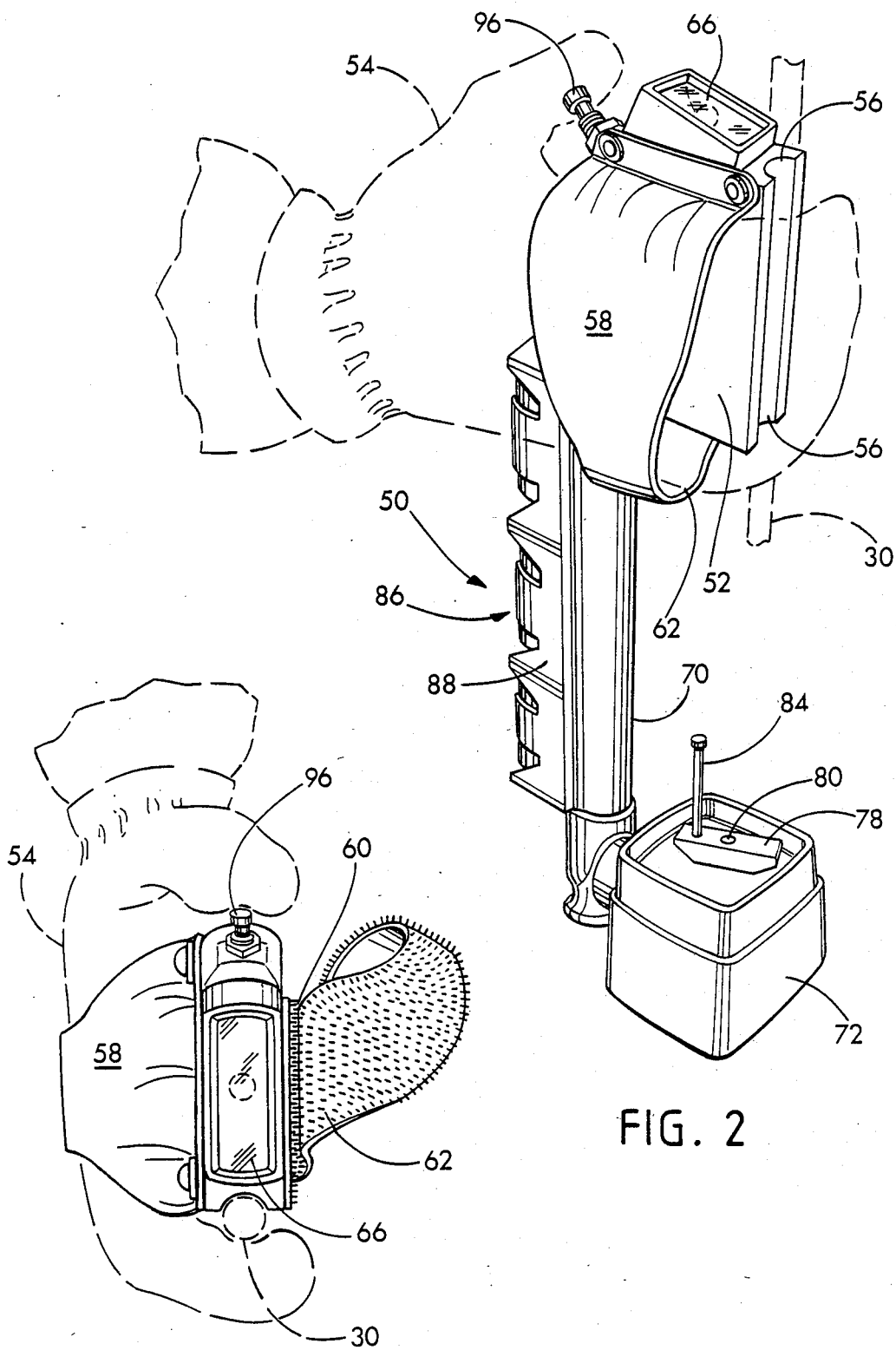
FIG. 2 is a front perspective view of the reel winder of the present invention absent the ice fishing tip-up device.
FIG. 3 is a top elevation view of the reel winder of FIG. 1.
Figure 4:
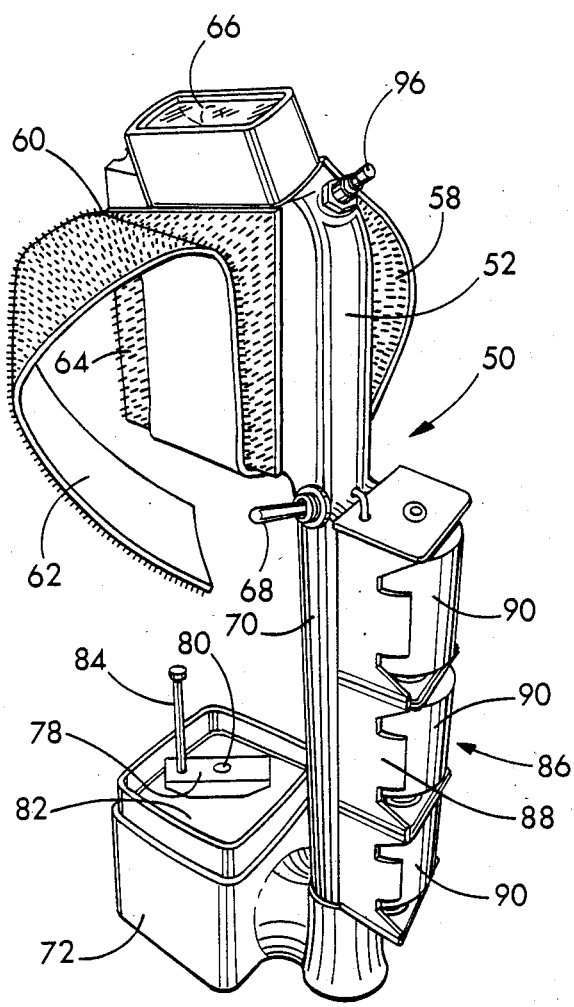
FIG. 4 is a back perspective view of the reel winder of the present invention.
Figure 5:
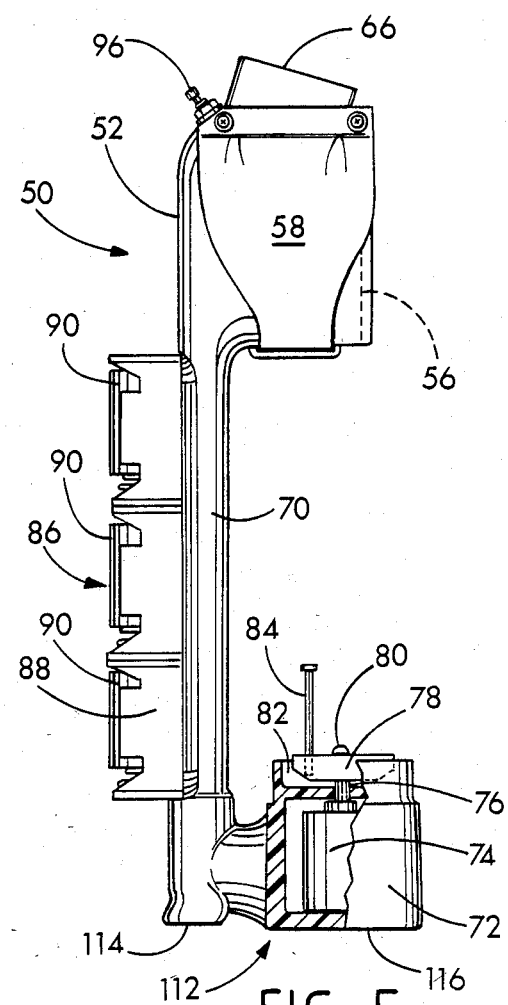
FIG. 5 is a partial cutaway side elevation view of the reel winder of the present invention.

The reel winder 50 includes a hand grip area 52 designed to allow the operator's hand, designated at 54, to fit thereon. In view of the cold conditions, generally associated with ice fishing, the hand grip area 52 should be so designed as to allow the operator to utilize the reel winder 50 with gloves or mittens on. Additionally, the hand grip 52 is preferably provided with a hand retaining strap 58, which purpose is to secure the hand 54 to the hand grip 52 in a snug-fit relationship. The hand retaining strap 58 preferably has some means for adjusting the snug-fit relationship. Although this means may include any number of buckles or clasps known to the art, the preferred method of securing the hand retaining strap 58 in a snug-fit relationship is by a hook-and-loop type fastener such as those sold under the trademark Velcro ® attachment means 60, as best illustrated in FIG. 3. The Velcro ® attachment means 60 includes a Velcro ® attachment strap 62 which can be adjustably positioned on a Velcro ® backing 64, which is secured to the hand grip 52.

It is also a preferred feature of the present invention to provide the reel winder 50 with a light assembly 66 in the hand grip 52. The light assembly comprises a means to activate the light assembly in a convenient location on the reel winder 50. It has been found that an activating switch 68 placed in a position near the hand grip 52 is the most convenient location for the light assembly.

Depending downwardly from the hand grip 50 is the reel shaft 70, having a certain defined length in order to effect the proper placement of the ice fishing tip-up device 10 on the reel winder 50. The reel shaft 70 generally has a circular or square configuration.

Positioned at the lower end of the reel shaft 70 is a motor casing 72 comprising a powered geared motor 74 of small proportions. The motor 74 includes a rotating drive shaft 76 to which is attached a collar 78 by means of a set screw 80. The collar 78 is placed transversely with respect to the drive shaft 76 and extends from the motor casing 72 into a work area 82. Depending from one end of the collar 78 is a projecting trip shaft pin 84.

Figure 6:
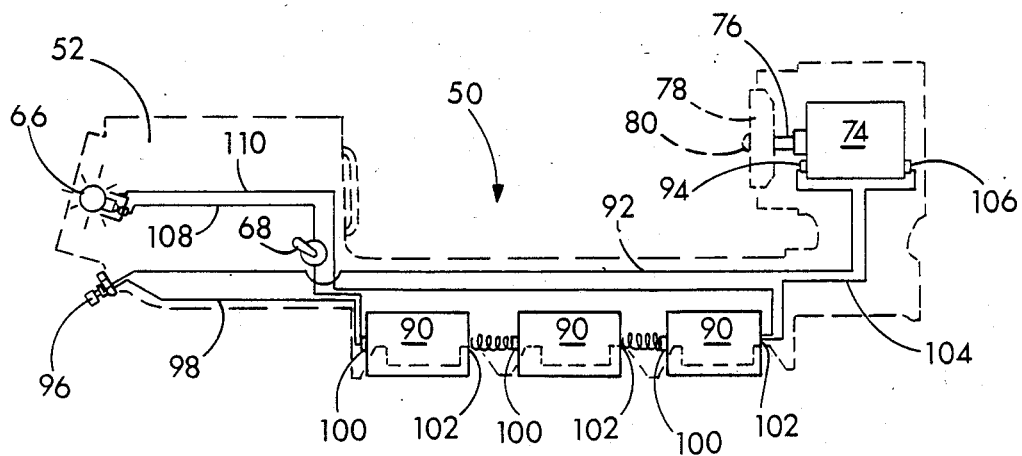
FIG. 6 is a schematic view of the electrical circuitry of the reel winder of the present invention.

The motor 74 is a standard motor known to the art, which is driven by a power source, designated at 86. Although the power source may be any of a number of sources which will cause the energizing of the motor 74, it is preferred to have a portable power source, such as a battery pack. The preferred mode is illustrated in FIGS. 1, 2, 4, 5 and 6 as a battery pack 88 attached to the reel shaft 70. A series of batteries 90 are placed in the battery pack 88 for providing the energy to operate the motor 74. The wiring system for connecting the power source 86 to the motor 74 and to the light assembly 66 is schematically shown in FIG. 6, which illustrate a simplified schematic wiring system for the motor 74 including a positive electrode wire 92 connected to the positive electrode 94 of the motor 74 at one end and a conveniently located push button or equivalent switch 96 at the other end. The push button 96 provides a connection between the positive electrode wire 92 and the positive battery terminal wire 98. As best illustrated in FIG. 6, the series of batteries 90 are connected in series from the positive terminals 100 to the negative terminals 102. A connecting wire 104 leads from the last negative terminal 102 of the battery 90 to the negative electrode 106 of the motor. By activating the push button 96, the electrical circuit is complete causing the operation of the motor which in turn causes the rotation of the drive shaft 76 and the attached collar 78 and pin 84.

If a light assembly 66 is to be included on the reel winder 50, it is preferably for convenience and simplicity of the device to incorporate the same power source 86 to activate the light assembly 66. The wiring operation is similar to that illustrated with respect to the operation of the motor 74. A positive electrode connecting wire 108 passes through the switch 68 to the positive terminal 100 of the power source 86. The negative electrode connecting wire 110 connects the negative electrode of the lighting assembly to the negative terminal 102 of the power source 86. By activating the switch 68 to the on position, the electrical connection is complete causing the operation of the lighting assembly 66.

Although it is contemplated that the reel winder 50, or parts of it, can be made of a variety of materials such as wood, metal or plastics, it is preferred to make the reel winder of a durable plastic, such as polyvinylchloride, which is light in weight, strong and durable. The plastic also resists cold weather freeze-ups.

Reference is now made to FIG. 1 for a description of the operation of the reel winder 50. After fishing is complete, the tip-up device 10 is removed from the fishing hole and inverted as illustrated in FIG. 1. The elongated tube 30 of the tip-up device 10 is then placed at the forward end of the hand grip 52 of the reel winder 50. Preferably, a groove 56 is located at the forward end of the hand grip 52 in order to facilitate the placement of the elongated tube 30 on the reel winder 50. The elongated tube 30 is held in position by means of the operator's hand 54. In order to facilitate this operation, the hand restraining strap 58 is then tightened by means of the Velcro ® attachment 60. The elongated tube 30 is positioned on the reel winder 50 such that the trip shaft 32 engages the trip shaft pin 84 of the reel winder 50.

In order to automatically wind the fishing line 38 onto the reel 36, the operator activates the reel winder 50 by pushing the push button 96. This in turn causes the motor 74 to operate thus rotating the drive shaft 76 and the trip shaft pin 84 in the direction of the arrows 85. The rotation of the trip shaft pin 84 causes the trip shaft 32 to rotate, thus also rotating the reel 36 in the direction of the arrow 87. The rotation of the reel 36 acts to draw the fishing line 38 along the direction of the arrow 89 onto the reel 36 in a winding action.

It is within the scope of the present invention to utilize a reversible motor 74 and a dual acting push button 96 to actuate the motor in either direction. In this manner, the reel winder 50 may be used with an ice fishing device 10 having a reel 36 wound in either a clockwise or counter-clockwise manner.

When not in operation, the reel winder may be conveniently placed near the fishing hole and positioned by means of a stand 112, which is formed by a combination of the base 114 of the reel shaft 70 and the base 116 of the motor casing 72.

The reel winder 50 with its versatile light assembly 66 can also be used as a self-standing flashlight. This frees the operator's hands and provides plenty of light when unhooking a fish or retying a fish hook. It can also be used as a handheld flashlight. This has several advantages, especially when retrieving the tip-up device 10 in the dark.

With the use of the reel winder 50, ice fishing can be simplified and made more desirable due to the easier and faster way to wind the reel. Further, reels can be wound without the necessity of removing outer gear, such as mittens or gloves. This is advantageous, especially when the weather is exceptionally cold and the wind is blowing across the ice. As a result of the convenient location of the push button 96, the reel winder 50 can be used with heavy mittens.

It is understood that the invention is not confined to the particular construction and arrangement herein illustrated and described, but embraces such modified forms thereof as come within the scope of the following claims:

What is claimed is:

1. An apparatus for automatically winding fishing line onto a reel of an ice fishing device, wherein the ice fishing device comprises a support frame, an elongated tube connected to the support frame, an axle extending through the elongated tube having a first end and a second end, the first end having the reel wound with fishing line mounted thereon, and the second end comprising a rotatable trip shaft, the apparatus comprising:
   (a) an elongated shaft of defined length, the shaft having a first end and a second end, wherein the first end of the shaft is defined by a hand grip;
   (b) a motor mounted on the second end of the shaft, the motor comprising a rotatable drive shaft;
   (c) a projecting trip shaft pin mounted on the drive shaft of the motor;
   (d) a power source connected to the motor; and
   (e) means for selectively conducting power from the power source to the motor, wherein the hand grip includes means for receiving the elongated tube and positioning it such that the trip shaft at the second end of the axle is in rotatable driving engagement with the projecting trip shaft pin.

2. The apparatus of claim 1, wherein the hand grip comprises a hand retaining strap.

3. The apparatus of claim 2, wherein the hand retaining strap comprises means to secure a hand to the hand grip in a snug fit manner.

4. The apparatus of claim 3, wherein the means to secure the hand to the hand grip is a hook and loop attachment device.

5. The apparatus of claim 1 further comprising a light assembly in the hand grip, and means to activate the light assembly.

6. The apparatus of claim 5 wherein the power source for the motor also powers the light assembly.

7. The apparatus of claim 5 wherein the means to activate the light assembly comprises a switch on the elongated shaft.

8. The apparatus of claim 1 wherein the power source is a battery pack.

9. The apparatus of claim 8 wherein the battery pack is mounted on the elongated shaft.

10. The apparatus of claim 1 further comprising a stand for supporting the apparatus in upright position.

11. The apparatus of claim 1 wherein the means for selectively conducting power from the power source to the motor comprises a push button positioned on the hand grip.

* * * * *